United States Patent
Tian et al.

(10) Patent No.: US 11,155,645 B2
(45) Date of Patent: Oct. 26, 2021

(54) PREPARATION METHOD OF SLOWLY DIGESTIBLE STARCH

(71) Applicant: Jiangnan University, Wuxi (CN)

(72) Inventors: Yaoqi Tian, Wuxi (CN); Xiaoxue Lu, Wuxi (CN); Jinling Zhan, Wuxi (CN); Rongrong Ma, Wuxi (CN); Ranran Chang, Wuxi (CN); Long Chen, Wuxi (CN); Zhengyu Jin, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/325,270

(22) Filed: May 20, 2021

(65) Prior Publication Data

US 2021/0269556 A1  Sep. 2, 2021

Related U.S. Application Data

(63) Continuation of application No. PCT/CN2020/099123, filed on Jun. 30, 2020.

(30) Foreign Application Priority Data

Feb. 26, 2020  (CN) .......................... 202010119374.0

(51) Int. Cl.
*C08B 31/00* (2006.01)

(52) U.S. Cl.
CPC .................................... *C08B 31/00* (2013.01)

(58) Field of Classification Search
CPC ...................................................... C08B 30/12
See application file for complete search history.

(56) References Cited

FOREIGN PATENT DOCUMENTS

| CN | 101891831 A | 11/2010 |
|---|---|---|
| CN | 102212213 A | 10/2011 |
| CN | 102653563 A | 9/2012 |
| CN | 104987422 A | 10/2015 |
| CN | 107686524 A | 2/2018 |
| CN | 107739743 A | 2/2018 |
| CN | 110292166 A | 10/2019 |
| CN | 111264840 A | 6/2020 |
| KR | 20170016664 A | 2/2017 |

OTHER PUBLICATIONS

English machine translation of CN 104987442 B by Google Patents, https://patents.google.com/patent/CN104987422B/en?oq=CN104987422, accessed online on Aug. 16, 2021. (Year: 2021).*
Ji et al., Food Hydrocolloids, 2018, 77, p. 720-725. (Year: 2018).*
Jiang et al., Starch—Starke, 2020, 72, 1900298, 9 pages, Published online: Mar. 19, 2020. (Year: 2020).*
Zhan, Jinling et. al., "Resistant properties and crystalline structure of high amylose corn starch-emulsifier complexes", Food and Fermentation Industries, 2016 v42 No. 9 p. 64.
Ru, Yuan et al., "Effect of dry heating on properties of corn starch", Science and Technology of Food Industry, vol. 36, No. 16, 2015.

* cited by examiner

*Primary Examiner* — Jonathan S Lau
(74) *Attorney, Agent, or Firm* — IPro, PLLC

(57) ABSTRACT

The disclosure discloses a preparation method of slowly digestible starch, and belongs to the technical field of starch modification. In the disclosure, ordinary rice starch and corn starch are used as raw materials, and the starch is fully de-clustered through dry-heat amorphization treatment, instead of traditional hydrothermal gelatinization; then ultrasonic treatment is used to induce complexation of amino acids and starch milk to form VI-type crystal; and finally through an extrusion technology, the VI-type crystal is transformed into VII-type crystal, and the content of the slowly digestible starch is significantly increased to 55%-60%. The disclosure is highly efficient, simple and environmentally friendly, and the prepared product can be used as a drug sustained-release carrier or a low-glycemic index food ingredient, and has important practical value for the regulation of chronic diseases such as diabetes and cardiovascular diseases.

8 Claims, No Drawings

PREPARATION METHOD OF SLOWLY DIGESTIBLE STARCH

TECHNICAL FIELD

The disclosure relates to a preparation method of slowly digestible starch, and belongs to the technical field of starch modification.

BACKGROUND

Slowly digestible starch refers to a part of starch that is digested slowly in the small intestine, and can maintain the stability of blood sugar after a meal. Increasing the content of slowly digestible starch can improve the nutritional quality of starch, and has important practical significance for the management and control of chronic diseases such as obesity, diabetes and cardiovascular diseases.

Based on the characteristic of enzymatic resistance of complexes, it is believed that slowly digestible starch can be prepared by a complexing reaction between starch and some lipids. However, the complexing reaction usually requires high temperature or the participation of acid-base reagents, leading to lipid oxidation or introducing potential safety risk factors. According to reports, amino acids can not only form complexes with starch, but also inhibit the activity of digestive enzymes. At present, the main methods for complexing starch and amino acids include blending annealing and grafting modification. The content of slowly digestible starch prepared by the two methods is 15%-35%. In the current process of complexing starch and amino acids to prepare slowly digestible starch, a hydrothermal gelatinization method is usually used to prepare starch milk. However, one of the limitations of the method is that the solid content of a starch milk system is very low (5%-10%), leading to that the utilization rate of starch is difficult to improve, and drying of a large amount of water consumes a lot of energy. The other limitation is that the viscosity of the starch system increases significantly, which is not conducive to the blending annealing and grafting reaction of amino acids.

In addition, the inventor's team found in the early stage that rice protein can significantly reduce the digestibility of starch, but a protein extraction process usually involves partial degradation and exposure of hydrophobic amino acids, resulting in a bitter taste of protein as a food ingredient, which is not conducive to high-quality food processing and manufacturing.

SUMMARY

Technical Problems

A traditional hydrothermal gelatinization method for preparing starch milk leads to low utilization rate of starch in addition to a significant increase in the viscosity of the starch system, which is not conducive to the blending annealing and grafting reaction of amino acids. At the same time, the slowly digestible starch content in traditional starch complexes prepared with amino acids is low. Although the inventor found in the early stage that rice protein can significantly reduce the digestibility of starch, the protein extraction process usually involves partial degradation and exposure of hydrophobic amino acids, resulting in a bitter taste of protein as a food ingredient, which is not conducive to high-quality food processing and manufacturing.

Technical Scheme

In view of the problems, the disclosure provides a preparation method of slowly digestible starch. The disclosure uses a dry-heat amorphization technology to replace traditional thermal gelatinization, and uses ultrasonic complexing instead of traditional blending annealing or grafting modification methods, to prepare a VI-type starch-amino acid complex; at the same time, the use of acid-base reagents is avoided, and the disclosure has significant environmental protection advantages. In addition, transformation of the crystalline characteristic of the VI-type starch-amino acid complex into a VII-crystalline form is realized by an extrusion technology, and the content of slowly digestible starch in the system is significantly increased.

The disclosure provides a method for preparing slowly digestible starch. The method includes the following steps: carrying out de-clustering amorphization treatment on starch by means of dry-heat amorphization; then preparing a VI-type starch-amino acid complex by low-temperature ultrasonic treatment; and finally, through extrusion treatment, transforming the crystalline characteristic of the VI-type starch-amino acid complex into a VII-crystalline form, thereby obtaining a product with the slowly digestible starch content of up to 55%-60%.

In one implementation of the disclosure, the method includes the following steps:

(1) dry-heat amorphization: carrying out dry-heat amorphization treatment on rice starch or corn starch at 135-145° C. for 8-10 min, and adding water to prepare starch milk with the mass concentration of 35%-40% (w/w, the ratio of a starch dry basis to the total mass of the starch milk);

(2) amino acid complexing: adding 5%-8% (w/w, the ratio of a dry amino acid basis to the total mass of the starch milk) amino acid to the starch milk obtained in step (1), and carrying out ultrasonic complexing treatment after mixing; the ultrasonic frequency is 30-40 kHz, the treatment power is 800-1000 W, the temperature is 50-55° C., and the treatment time is 20-30 min, thereby obtaining a VI-type starch-amino acid complex with the water content of about 55%-60%;

(3) centrifugal dehydration: centrifugally dehydrating the product obtained in step (2) to obtain a precipitate with the water content of 30%-35%;

(4) crystal transformation: carrying out extrusion treatment on the precipitate obtained in step (3); the temperature of four sections of an extruder is 85-90° C., 100-105° C., 115-120° C. and 125-130° C. respectively, and the screw speed is 100-110 rpm, thereby transforming the complex from VI-type crystal to VII-type crystal; and (5) airflow drying: drying the VII-type crystal complex obtained in step (4) with an airflow to obtain a product with high heat resistance and high slowly digestible starch content.

In one implementation of the disclosure, the dry-heat amorphization treatment in step (1) is to ensure that starch crystals are destroyed by the high-temperature dry-heat technology; the starch gelatinization degree reaches 90% or above, the dry-heat amorphization temperature is 145° C., and the time is 8-10 min.

In one implementation of the disclosure, the amino acid added in step (2) is any one of glutamic acid and leucine, and the added amount is 7% of the mass of the starch milk.

In one implementation of the disclosure, the leucine added in step (2) is a fat-soluble amino acid, and is firstly dissolved and dispersed by anhydrous ethanol; and the volume dosage of the anhydrous ethanol is 0.01-0.02 time the volume dosage of the starch milk.

In one implementation of the disclosure, for the ultrasonic treatment in step (2), the ultrasonic frequency is 30 kHz, the treatment power is 800 W, the temperature is 55° C., and the action time is 30 min.

In one implementation of the disclosure, the centrifugal speed of the centrifugal dehydration in step (3) is 5000 rpm, and the centrifugal time is 10-15 min.

In one implementation of the disclosure, the temperature of four sections of the extruder in step (4) is set to 90° C., 105° C., 115° C. and 125° C. respectively, and the screw speed is 100 rpm.

In one implementation of the disclosure, the temperature of an air inlet of an airflow dryer in step (5) is set to 140° C.

The disclosure provides the slowly digestible starch prepared by the above method.

The disclosure provides application of the method for preparing the slowly digestible starch in the fields of preparation of pharmaceutical excipients and food ingredients.

Beneficial Effects (1) The disclosure uses rice starch or corn starch as a raw material, and after dry-heat amorphization treatment, the starch can be de-clustered and gelatinized, and the solid content of the starch milk can reach 35%-40%.

(2) The disclosure adopts a low-temperature ultrasonic induction complexing technology, and amorphous starch and amino acid can be complexed under low-temperature ultrasonic treatment to form the VI-crystalline starch-amino acid complex.

(3) The disclosure adopts the extrusion technology to transform VI-type crystal into VII-type crystal through extrusion. Part of the VII-type crystals forms a complex and the other part is released in the intestinal tract to inhibit the activity of digestive enzymes in the body, and the content of slowly digestible starch is increased to 55%-60%.

(4) The disclosure further sequences and analyzes the amino acid composition of rice protein, and finally screens out the key amino acids, glutamic acid and leucine, leading to the reduction of starch digestibility. Compared with protein, the amino acids used as food ingredients have the advantages of improved flavor, more significant slow digestion characteristics, low costs and the like.

(5) The use of the production process of slowly digestible starch of the disclosure overcomes the defects of low yield and high cost in the existing production process of amino acid based slowly digestible starch, and provides a new idea for the high-value processing of rice starch and corn starch resources.

DETAILED DESCRIPTION

The preferred examples of the disclosure will be described below. It should be understood that the examples are for better explaining the disclosure and are not intended to limit the disclosure.

1. Determination of Starch-Amino Acid Complex Index

The complex index of starch and amino acid is determined by an iodine colorimetric method. The prepared VII-type starch-amino acid complex is mixed with distilled water in a centrifuge tube. The mixture is heat-treated at 92.5° C. for 10 min to completely gelatinize the starch material. After the mixture is cooled at room temperature, distilled water is added, the mixture is subjected to vortex treatment for 3 minutes and then an iodine solution (2.0% KI+1.3% $I_2$) is added. By end-to-end rotation, the mixture is completely mixed. The absorbance of the final solution is measured at 574 nm, and the complex index (CI) of starch and amino acid is calculated according to the following formula:

$$CI(\%) = \frac{\text{Absorbance of starch paste} - \text{Absorbance of complex}}{\text{Absorbance of starch paste}} \times 100\%$$

2. Determination of Content of Slowly Digestible Starch

The content of slowly digestible starch is determined by referring to the Englyst method. The prepared VII-starch-amino acid complex is mixed uniformly with deionized water by vortex shaking. Test tubes are moved into a 37° C. shaking water bath kettle, 8 glass beads and 4 mL of sodium acetate buffer (0.5 mol/L, pH 5.2) are added to each test tube, and incubation is carried out for 30 min. After incubation, a freshly prepared mixed enzyme solution is added, and the test tubes are shaken in a water bath at 37° C. 1 mL of hydrolysate is taken at 0, 10, 20, 30, 45, 60, 90, 120 and 180 min respectively. After enzyme deactivation with anhydrous ethanol, the glucose content of the incubation solution is determined using glucose determination kits. The content of slowly digestible starch is calculated by combining the values of G20 (glucose released after 20 minutes), G120 (glucose released after 120 minutes) and Ws (weight of sample) using the following formula:

$$SDS(\%) = \frac{(G120 - G20) \times 0.9}{W_S} \times 100\%$$

3. In the following experiments, the high-temperature dry-heat amorphization equipment used is GZX-9146MBE type air dry oven of Shanghai Boxun Company, and the ultrasonic equipment is SB-4200DT ultrasonic treatment instrument of Ningbo Scientz Biotechnology Co., Ltd.

Example 1

(1) Dry-heat amorphization: 1000 g of rice starch was weighed and subjected to dry-heat amorphization treatment; the temperature was set to 145° C.; and the time was set to 10 min. Then water was added to prepare starch milk with the concentration of 35% (w/w, the ratio of the starch dry basis to the total mass of the starch milk).

(2) Amino acid complexing: Glutamic acid was added to the starch milk subjected to the dry-heat amorphization treatment, and the added amount was 7% of the total mass of the starch milk. Complexing was carried out by ultrasonic emulsification, and the ultrasonic treatment time was 30 min. The ultrasonic working frequency was set to 30 kHz; the treatment power was 800 W; and the temperature was 55° C.

(3) Centrifugal dehydration: The rice starch-glutamic acid complex obtained by ultrasonic treatment in step (2) was subjected to centrifugal dehydration to obtain a precipitate. The centrifugal speed was set to 5000 rpm and the centrifugal time was 15 min. After centrifugation, the water content of the complex was reduced from about 58 wt % to 35 wt %.

(4) Crystal transformation: The product obtained by centrifugal dehydration in step (3) was subjected to extrusion treatment. The temperature of four sections of an extruder was set to 90° C., 105° C., 115° C. and 125° C. respectively, and the screw speed was 100 rpm. Under the condition, the complex was transformed from VI-type crystal to VII-type crystal.

(5) Airflow drying: The VII-type starch-amino acid complex obtained by extrusion in step (4) was dried with airflow to obtain slowly digestible starch, and the temperature of an air inlet of an airflow dryer was set to 140° C.

The complex index of the product obtained in step (5) was determined by the iodine colorimetric method, and the complex index was determined as 46.7%. The content of the slowly digestible starch of the resulting product was determined by the Englyst method, and the content of the slowly digestible starch was determined as 57.4%.

Example 2

(1) Dry-heat amorphization: 1000 g of rice starch was weighed and subjected to dry-heat amorphization treatment; the temperature was set to 145° C.; and the time was set to 10 min. Then water was added to prepare starch milk with the concentration of 35% (w/w, the ratio of the starch dry basis to the total mass of the starch milk).

(2) Amino acid complexing: Firstly, leucine was dissolved and dispersed with anhydrous ethanol. The amount of the anhydrous ethanol was 0.01 time the volume of the starch milk. The added amount of the leucine was 7% of the total mass of the starch milk, and the dissolved and dispersed leucine was added to the starch milk subjected to the dry-heat amorphization treatment. Complexing was carried out by ultrasonic emulsification, and the ultrasonic treatment time was 30 min. The ultrasonic working frequency was set to 30 kHz; the treatment power was 800 W; and the temperature was 55° C.

(3) Centrifugal dehydration: The rice starch-leucine complex obtained by ultrasonic treatment in step (2) was subjected to centrifugal dehydration to obtain a precipitate. The centrifugal speed was set to 5000 rpm and the centrifugal time was 15 min. After centrifugation, the water content of the complex was reduced from about 58 wt % to 35 wt %.

(4) Crystal transformation: The product obtained by centrifugal dehydration in step (3) was subjected to extrusion treatment. The temperature of four sections of an extruder was set to 90° C., 105° C., 115° C. and 125° C. respectively, and the screw speed was 100 rpm. Under the condition, the complex was transformed from VI-type crystal to VII-type crystal.

(5) Airflow drying: The VII-type starch-amino acid complex obtained by extrusion in step (4) was dried with airflow to obtain slowly digestible starch, and the temperature of an air inlet of an airflow dryer was set to 140° C.

The complex index of the product obtained in step (5) was determined by the iodine colorimetric method, and the complex index was determined as 49.2%. The content of the slowly digestible starch of the resulting product was determined by the Englyst method, and the content of the slowly digestible starch was determined as 59.7%.

Example 3

(1) Dry-heat amorphization: Same as step (1) in Example 1.

(2) Amino acid complexing: Complexing was carried out by ultrasonic emulsification. The ultrasonic working frequency was adjusted from 30 kHz to 40 kHz, and other operating conditions were the same as in Example 1.

(3) to (5): Same as steps (3) to (5) in Example 1.

The complex index of the product obtained in step (5) was determined by the iodine colorimetric method, and the complex index was determined as 45.3%. The content of the slowly digestible starch of the resulting product was determined by the Englyst method, and the content of the slowly digestible starch was determined as 56.2%.

Example 4

(1) Dry-heat amorphization: Same as step (1) in Example 1.

(2) Amino acid complexing: Complexing was carried out by ultrasonic emulsification. The ultrasonic working power was adjusted from 800 W to 1000 W, and other operating conditions were the same as in Example 1.

(3) to (5): Same as steps (3) to (5) in Example 1.

The complex index of the product obtained in step (5) was determined by the iodine colorimetric method, and the complex index was determined as 47.3%. The content of the slowly digestible starch of the resulting product was determined by the Englyst method, and the content of the slowly digestible starch was determined as 58.2%.

Example 5

(1) to (3) were the same as steps (1) to (3) in Example 1.

(4) Crystal transformation: The product obtained by centrifugal dehydration in step (3) was subjected to extrusion treatment. The temperature of four sections of an extruder was set to 85° C., 100° C., 115° C. and 125° C. respectively, and the screw speed was 100 rpm. Under the condition, the complex was transformed from VI-type crystal to VII-type crystal.

(5): Same as step (5) in Example 1.

The complex index of the product obtained in step (5) was determined by the iodine colorimetric method, and the complex index was determined as 45.9%. The content of the slowly digestible starch of the resulting product was determined by the Englyst method, and the content of the slowly digestible starch was determined as 56.2%.

Comparative Example 1

The dry-heat amorphization treatment method of step (1) in Example 1 was replaced with hydrothermal gelatinization: 1000 g of rice starch was taken and water was added to prepare rice starch milk with the concentration of 10% (w/w, the ratio of the starch dry basis to the total mass of the starch milk). The rice starch milk was subjected to a boiling water bath for 30 min while stirring, and cooled to 60° C. for heat preservation. The conditions or parameters of steps (2) to (4) were the same as those in Example 1.

Compared with Example 1, the complex index and the content of the slowly digestible starch of the product prepared in the present comparative example were reduced to 32.5% and 40.2% respectively.

Comparative Example 2

The amino acid complexing method of step (2) in Example 1 was changed, and the ultrasonic induction step was omitted. Other steps were the same as those in Example 1.

Compared with Example 1, the complex index of the product prepared in the present comparative example was significantly reduced to 15.2%, and the content of the slowly digestible starch was reduced to 36.7%. From the present comparative example, it can be proved that ultrasonic induction is the key to the complexation of amino acids and rice starch, and has the effect of significantly promoting the formation of the slowly digestible starch.

Comparative Example 3

The operation of step (4) Crystal transformation in Example 1 was omitted, and other experimental steps were the same as those in Example 1.

Compared with Example 1, the complex index of the product prepared in the present comparative example did not change significantly, but the content of the slowly digestible starch decreased to 38.8%. The result can explain the effect of the extrusion treatment in step (4) of Example 1: the VI-crystal was transformed into VII-crystal, and the structure of "internal embedding and external adsorption" can easily achieve the purpose of increasing the content of the slowly digestible starch of the system.

Comparative Example 4

The preparation method of the slowly digestible starch in Example 1 was changed, and the slowly digestible starch was prepared by the traditional amino acid blending annealing method:

(1) 100 g of rice starch was dissolved in water and stirred at room temperature to prepare rice starch milk with the concentration of 35% (w/w, the ratio of the starch dry basis to the total mass of the starch milk).

(2) Glutamic acid was added to the starch milk, the mass of the glutamic acid was 5% of the mass of the starch milk, and the mixture was stirred evenly at room temperature.

(3) The mixture was shaken in a constant temperature water bath at 50° C. for 24 hours, taken out and dried at 40° C. until the water content was below 10 wt %. The product was cooled to room temperature, and crushed to obtain slowly digestible starch.

Compared with Example 1, the complex index of the product prepared in the present comparative example was reduced to 9.5%, and the content of the slowly digestible starch was reduced to 21.4%.

Comparative Example 5

(1) Dry-heat amorphization: 1000 g of rice starch was weighed and subjected to dry-heat amorphization. The amorphization temperature in Example 1 was adjusted from 145° C. to 130° C., and the treatment time was 10 min. Water was added to prepare starch milk with the concentration of 35% (w/w, the ratio of the starch dry basis to the total mass of the starch milk).

Steps (2) to (5) were same as those in Example 1.

The complex index of the product obtained in step (5) was determined by the iodine colorimetric method, and the complex index decreased to 29.5%. The content of the slowly digestible starch of the resulting product was determined by the Englyst method, and the content of the slowly digestible starch decreased to 38.3%.

Comparative Example 6

(1) Dry heat amorphization: 1000 g of rice starch was weighed and subjected to dry heat amorphization treatment. The temperature was set to 145° C., and the treatment time was adjusted from 10 min in Example 1 to 7 min. Then water was added to prepare starch milk with the concentration of 35% (w/w, the ratio of the starch dry basis to the total mass of the starch milk).

Steps (2) to (5) were same as those in Example 1.

The complex index of the product obtained in step (5) was determined by the iodine colorimetric method, and the complex index decreased to 40.1%. The content of the slowly digestible starch of the resulting product was determined by the Englyst method, and the content of the slowly digestible starch decreased to 46.8%.

Comparative Example 7

The preparation method of the slowly digestible starch in Example 1 was changed, and the slowly digestible starch was prepared by the amino acid grafting modification method:

(1) 100 g of rice starch was dissolved in water and stirred at room temperature to prepare rice starch milk with the concentration of 35% (w/w, the ratio of the starch dry basis to the total mass of the starch milk).

(2) Glutamic acid was added to the starch milk, the mass of the glutamic acid was 5% of the starch mass, and the pH of the mixed solution was adjusted to 7.5 with a PBS buffer solution.

(3) The mixed solution was placed in a constant temperature water bath at 70° C. and stirred continually, and reacted at constant temperature for 1 h.

(4) The product obtained in step (3) was centrifuged, and the supernatant was discarded to obtain a precipitate I. The centrifugal speed was set to 5000 rpm and the centrifugal time was set to 15 min.

(5) The precipitate I was rinsed with deionized water, and the supernatant was discarded by centrifugation to obtain a precipitate II.

(6) The precipitate II was freeze-dried to obtain slowly digestible starch.

Compared with Example 1, the complex index of the product prepared in the present comparative example decreased to 6.3%, and the content of the slowly digestible starch decreased to 18.2%.

Comparative Example 8

The method of (2) Amino acid complexing in Example 1 was changed, and slowly digestible starch was prepared by the method of complexing with rice protein. Other steps were the same as those in Example 1.

Compared with Example 1, the complex index of the product prepared in the present comparative example decreased to 17.7%, and the content of the slowly digestible starch decreased to 25.1%.

TABLE 1

Determination results of complex index and content of slowly digestible starch

| Sample | Complex index (%) | Content of slowly digestible starch (%) |
|---|---|---|
| Example 1 | 46.7 ± 0.7$^{bc}$ | 57.4 ± 1.3$^{bc}$ |
| Example 2 | 49.2 ± 0.9$^{a}$ | 59.7 ± 0.7$^{a}$ |
| Example 3 | 45.3 ± 0.7$^{c}$ | 56.2 ± 1.0$^{c}$ |
| Example 4 | 47.3 ± 1.2$^{ab}$ | 58.2 ± 0.9$^{ab}$ |
| Example 5 | 45.9 ± 0.9$^{c}$ | 56.2 ± 1.2$^{bc}$ |
| Comparative example 1 | 32.5 ± 0.5$^{e}$ | 40.2 ± 0.9$^{e}$ |
| Comparative example 2 | 15.2 ± 0.3$^{h}$ | 36.7 ± 0.4$^{g}$ |
| Comparative | 45.3 ± 1.0$^{c}$ | 38.8 ± 0.7$^{f}$ |

TABLE 1-continued

Determination results of complex index and content of slowly digestible starch

| Sample | Complex index (%) | Content of slowly digestible starch (%) |
|---|---|---|
| example 3 | | |
| Comparative example 4 | 9.5 ± 0.3$^i$ | 21.4 ± 0.2$^i$ |
| Comparative example 5 | 29.5 ± 0.9$^f$ | 38.3 ± 0.7$^f$ |
| Comparative example 6 | 40.1 ± 1.1$^d$ | 46.8 ± 0.8$^d$ |
| Comparative example 7 | 6.3 ± 0.2$^g$ | 18.2 ± 0.3$^i$ |
| Comparative example 8 | 17.7 ± 0.5$^g$ | 25.1 ± 0.7$^h$ |

NOTE:
Different lowercase letters in each column represent significant differences between the values ($p < 0.05$)

From Table 1, through dry-heat amorphization, ultrasonic-induced amino acid complexing and crystal transformation (i.e. Example 1), the increase in the viscosity of the starch system is avoided, and the highest complex index and content of slowly digestible starch can reach 46.7% and 57.4% respectively. In the disclosure, changing parameters in the technology or method, or omitting part of the inventive steps will significantly affect the complex index and the content of slowly digestible starch. Especially, compared with complexing with rice protein, the disclosure has significant application advantages by preferring amino acid complexation. The disclosure can avoid the use of chemical acid-base reagents by using the technology, and has the advantages of environmental friendliness. In addition, the product of the disclosure can be used as a drug sustained-release adjuvant and a low-glycemic index food ingredient, and has excellent physiological functions of improving intestinal health, preventing diabetes, controlling weight and the like.

What is claimed is:

1. A method for preparing slowly digestible starch, comprising the following steps:
   (1) dry-heat amorphization: carrying out a dry-heat amorphization treatment on rice starch or corn starch at 135-145° C. for 8-10 min, and adding water to prepare starch milk with a mass concentration of 35 wt %-40 wt %;
   (2) amino acid complexing: adding amino acid accounting for 5%-8% of a total mass of the starch milk to the starch milk obtained in step (1), and carrying out an ultrasonic complexing treatment after mixing, wherein an ultrasonic frequency is 30-40 kHz, treatment power is 800-1000 W, a temperature is 50-55° C., and treatment time is 20-30 min;
   (3) centrifugal dehydration: centrifugally dehydrating a product obtained in step (2) to obtain a precipitate with a water content of 30%-35%;
   (4) crystal transformation: carrying out an extrusion treatment on the precipitate obtained in step (3), wherein temperatures of four sections of an extruder are 85-90° C., 100-105° C., 115-120° C. and 125-130° C., respectively, and a screw speed is 100-110 rpm, thereby transforming a complex from VI-type crystal to VII-type crystal; and
   (5) airflow drying: drying the VII-type crystal complex obtained in step (4) with airflow to obtain a product.

2. The method of claim 1, wherein for the dry-heat amorphization treatment adopted in step (1), a temperature of the dry-heat amorphization is 145° C., and the time is 8-10 min.

3. The method of claim 1, wherein the amino acid added in the step (2) is any one of glutamic acid and leucine, and an added amount is 7% of the total mass of the starch milk.

4. The method of claim 3, wherein the leucine added in the step (2) is a fat-soluble amino acid, and is firstly dissolved and dispersed by anhydrous ethanol; and a volume dosage of the anhydrous ethanol is 0.01-0.02 time a volume dosage of the starch milk.

5. The method of claim 1, wherein for the ultrasonic treatment in the step (2), the ultrasonic frequency is 30 kHz, the treatment power is 800 W, the temperature is 55° C., and the treatment time is 30 min.

6. The method of claim 1, wherein a centrifugal speed of the centrifugal dehydration in step (3) is 5000 rpm, and centrifugal time is 10-15 min.

7. The method of claim 1, wherein temperatures of four sections of the extruder in the step (4) are set to 90° C., 105° C., 115° C. and 125° C., respectively, and a screw speed is 100 rpm.

8. The method of claim 1, wherein a temperature of an air inlet of an airflow dryer in step (5) is set to 140° C.

* * * * *